United States Patent

Kallickal

(10) Patent No.: US 9,298,658 B2
(45) Date of Patent: Mar. 29, 2016

(54) USING PCI-E EXTENDED CONFIGURATION SPACE TO SEND IOCTLS TO A PCI-E ADAPTER

(71) Applicant: EMULEX DESIGN AND MANUFACTURING CORP., Costa Mesa, CA (US)

(72) Inventor: Jayamohan Kallickal, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 339 days.

(21) Appl. No.: 13/777,063

(22) Filed: Feb. 26, 2013

(65) Prior Publication Data

US 2014/0244888 A1  Aug. 28, 2014

(51) Int. Cl.
*G06F 13/32* (2006.01)
*G06F 13/40* (2006.01)

(52) U.S. Cl.
CPC .................................. *G06F 13/4022* (2013.01)

(58) Field of Classification Search
CPC ................................................. G06F 13/4022
USPC .................. 710/305–306, 260–269, 240–244
See application file for complete search history.

(56) References Cited

U.S. PATENT DOCUMENTS

| 7,308,551 | B2 * | 12/2007 | Arndt et al. | 711/173 |
|---|---|---|---|---|
| 7,480,303 | B1 * | 1/2009 | Ngai | 370/395.5 |
| 7,743,189 | B2 * | 6/2010 | Brown et al. | 710/104 |
| 8,141,092 | B2 * | 3/2012 | Brown et al. | 718/104 |
| 8,683,110 | B2 * | 3/2014 | Suzuki et al. | 710/314 |
| 8,868,814 | B2 * | 10/2014 | Higuchi et al. | 710/313 |
| 2005/0256991 | A1 * | 11/2005 | Keller | 710/309 |
| 2006/0195674 | A1 * | 8/2006 | Arndt et al. | 711/173 |
| 2007/0250910 | A1 * | 10/2007 | Miller et al. | 726/4 |
| 2008/0022018 | A1 * | 1/2008 | Konno et al. | 710/11 |
| 2008/0114916 | A1 * | 5/2008 | Hummel et al. | 710/266 |
| 2009/0133028 | A1 * | 5/2009 | Brown et al. | 718/104 |
| 2009/0276773 | A1 * | 11/2009 | Brown et al. | 718/1 |
| 2010/0115329 | A1 * | 5/2010 | Tanaka et al. | 714/5 |
| 2010/0165874 | A1 * | 7/2010 | Brown et al. | 370/254 |
| 2011/0219164 | A1 * | 9/2011 | Suzuki et al. | 710/316 |
| 2012/0110233 | A1 * | 5/2012 | Higuchi et al. | 710/313 |

* cited by examiner

*Primary Examiner* — Tim T Vo
*Assistant Examiner* — Kim T. Huynh (57) ABSTRACT

An adapter includes a network interface module configured to interface the adapter to a network and a Peripheral Component Interconnect Express (PCIe) interface module configured to interface the adapter to a PCIe bus. The PCIe interface module comprises registers in PCIe extended configuration space. The registers are configured to receive ioctls from the PCIe bus. The adapter also includes an ioctl processing module configured to receive the ioctls from the registers, to perform the ioctls, and to provide results of the ioctls to the registers for provision by the registers to the PCIe bus. The ioctls comprise commands that relate to transceiving of frames by the adapter on the network. The network interface may be Ethernet, Fiber Channel, Infiniband, etc. Examples of the ioctls include retrieving operation or error statistics, setting virtual channel tag and priorities, and setting a protocol address associated with a port of the adapter.

20 Claims, 5 Drawing Sheets

USING PCI-E EXTENDED CONFIGURATION SPACE TO SEND IOCTLS TO A PCI-E ADAPTER

BACKGROUND

Device drivers are the portion of an operating system that control devices, such as printers, video adapters, network adapters, sound devices and host adapters for controlling mass storage devices such as disk drives, tape drives and CD-ROM drives. It is common for the manufacturer of a device to develop a device driver for the device and contribute it to the operating system developer and/or distributor. However, at least two effects derive from this arrangement. First, if the device manufacturer provides the source code to the operating system developer/distributor, the manufacturer may forfeit some control over the publication of the source code. Second, the operating system developer/distributor controls when—and even whether or not—the device driver is included in its distribution of the next version of the operating system. This control may be in tension with the device manufacturer who knows customers who want to purchase and use the device in a system running the operating system.

BRIEF SUMMARY

Embodiments are described herein for sending ioctls to a Peripheral Component Interconnect (PCI) Express (PCIe) adapter from a user space program using the PCIe extended configuration space. Sending the ioctls through PCIe extended configuration space has advantages, many of which are described below. The advantage primarily derives from the fact that the PCIe extended configuration space may be accessed from user space (rather than exclusively from kernel space) without kernel involvement, and the user-space program can simply be downloaded from the device manufacturer or other developer and installed and run on the system by the root account, which has superuser privileges, without requiring a change to the PCIe adapter device driver.

In one aspect, embodiments provide an adapter. The adapter includes a network interface module configured to interface the adapter to a network. The adapter also includes a Peripheral Component Interconnect Express (PCIe) interface module configured to interface the adapter to a PCIe bus. The PCIe interface module comprises registers in PCIe extended configuration space. The registers are configured to receive ioctls from the PCIe bus. The adapter also includes an ioctl processing module configured to receive the ioctls from the registers, to perform the ioctls, and to provide results of the ioctls to the registers for provision by the registers to the PCIe bus. The ioctls comprise commands that relate to transceiving of frames by the adapter on the network.

In another aspect, embodiments provide a module of an adapter. The module includes a first portion configured to receive ioctls via Peripheral Component Interconnect Express (PCIe) extended configuration space. The module also includes a second portion configured to provide results of the ioctls via the PCIe extended configuration space. The ioctls comprise commands that relate to transceiving of frames by the adapter on a network to which the adapter is coupled.

In yet another aspect, embodiments provide a method. The method includes receiving, by a Peripheral Component Interconnect Express (PCIe) adapter, an ioctl via PCIe extended configuration space. The method also includes providing, by the PCIe adapter, a result of the ioctl via the PCIe extended configuration space. The ioctl comprises a command that relates to transceiving of frames by the adapter on a network to which the adapter is coupled.

BRIEF DESCRIPTION OF THE DRAWINGS

" FIGS. 5A and 5B are referred to collectively as FIG. 5.

DETAILED DESCRIPTION OF THE EMBODIMENTS

There has been a trend in recent years toward open source software development, meaning its source code is published for all to see. Intertwined with open source software development is collaborative development. That is, software developers employed by different companies or self-employed software developers contribute the software they develop. As mentioned above, when the manufacturer of a device develops a device driver for its device and contributes it, the source code for the new device driver may be published, and the source code may be scrutinized. If the operating system developer/distributor accepts a source code contribution, then the source code can be included in a distribution of the operating system, and not until.

The first effect—publication of the source code—may be undesirable for the device manufacturer, particularly if it includes secret and/or proprietary information. The second effect—the approval process—may also be problematic for the device manufacturer. First, there is no guarantee that the operating system developer/distributor will approve the device driver or modifications to it. Second, the approval process may take longer than the manufacturer would like it to take. The manufacturer may have extensively tested the device driver or modifications to it and believe them ready for distribution, but if the next operating system distribution release date is a few months away and/or the approval process takes a long time (in the worst case, just past the next release date), this may prevent sales and/or use of the new device.

The approval process may pose a particularly burdensome hurdle to the manufacturer, or other contributing software developer, when the need arises to add enhancements to the driver. For example, suppose a customer approaches the device manufacturer with a request for a new feature, a fix to a problem or a performance improvement. The manufacturer or other contributing software developer may be able to quickly develop and test changes to the device driver—which may be relatively self-contained and involve a relatively small amount of additional code—to meet the request; however, due to the approval process, it may be months until the changes make it into a distribution, if at all, and the source code may include information that the customer who requested the change and/or the manufacturer does not want published.

An operating system provides system calls (e.g., open, close, read, write) that enable programs to access devices. When a program opens a device (e.g., using the open system call), the operating system provides an identifier for the device that the program uses in subsequent system calls to access the device. The operating system uses the device identifier to direct the system call to an entry point of a device driver that controls the device. A program typically invokes the read and write system calls to read and write the device. However, there may be other operations that need to be performed with respect to the device that are not as common. Therefore, operating systems typically include a system call to perform these operations, which are commonly referred to as input/output control operations, or commands. In some operating systems, the system call is referred to as "ioctl," such as in most Unix® and Unix-like operating systems, including Linux and Mac OS X®. Other operating systems provide a similar system call, such as the DeviceIoControl function provided by the Win32 API of the Microsoft Windows® operating system. Typically, when the program makes the ioctl system call it provides a pointer to a data structure that specifies the command to be performed by the device. Example commands include ejecting a disc from a CDROM drive, blanking a video screen, or configuring or managing a device in some fashion.

It has been observed that a large percentage of the modifications to an open source operating system device driver—which implicates the open source development process issues identified above—involve modifications related to ioctls. Advantageously, embodiments are described herein that enable a user space program to send an ioctl to a device, namely a PCIe adapter, without going through the device driver—that is, without making an ioctl system call—by sending the ioctl directly to the PCIe adapter through PCIe extended configuration space.

GLOSSARY

Network: A "network" is a collection of electronic computing nodes in communication with one another. A network should be understood herein to include an entity denoted a "network" by a standard (e.g., Ethernet, USB) as well as an entity that fits the definition above that is denoted by another name by other standards, such as "fabric" by Fibre Channel and Infiniband or "bus" by SCSI.

Frame: A "frame" is a sequence of data words transmitted on a network that includes a header and a payload, wherein the header specifies at least a source address and destination address of the frame. A frame should be understood herein to include an entity denoted a "frame" by a standard (e.g., Ethernet, Fibre Channel) as well as an entity that fits the definition above that is denoted by another name by other standards, such as "packet" by Infiniband and USB or "command" by SCSI. A frame may encapsulate frames of other higher-level protocols.

PCIe adapter: A "PCIe adapter" is an electronic device that performs communication between a PCIe bus of a computer system and a network to which the adapter is coupled. A PCIe adapter receives commands from the computer system via the PCIe bus and transceives frames with the network in response to the commands. A PCIe adapter is intended to encompass both a PCIe device included on a motherboard as well as a PCIe device embodied on an add-in card adapted to plug-in to a PCIe slot.

Ioctl: An "ioctl" is a command sent to a PCIe adapter from a computer system in which the PCIe adapter resides that relates to the transceiving of frames by the adapter on the network to which the adapter is coupled. The command includes an operation code that specifies the operation to be performed. It should be understood for purposes of the present disclosure that the network on which the PCIe adapter transceives frames and to which the ioctls are related is not the PCIe fabric by which the PCIe adapter interconnects to the computer system; therefore, the ioctls do not relate to the transceiving of frames by the adapter on the PCIe fabric.

Module: A "module" is software, hardware or a combination of hardware and software.

Figure 1:
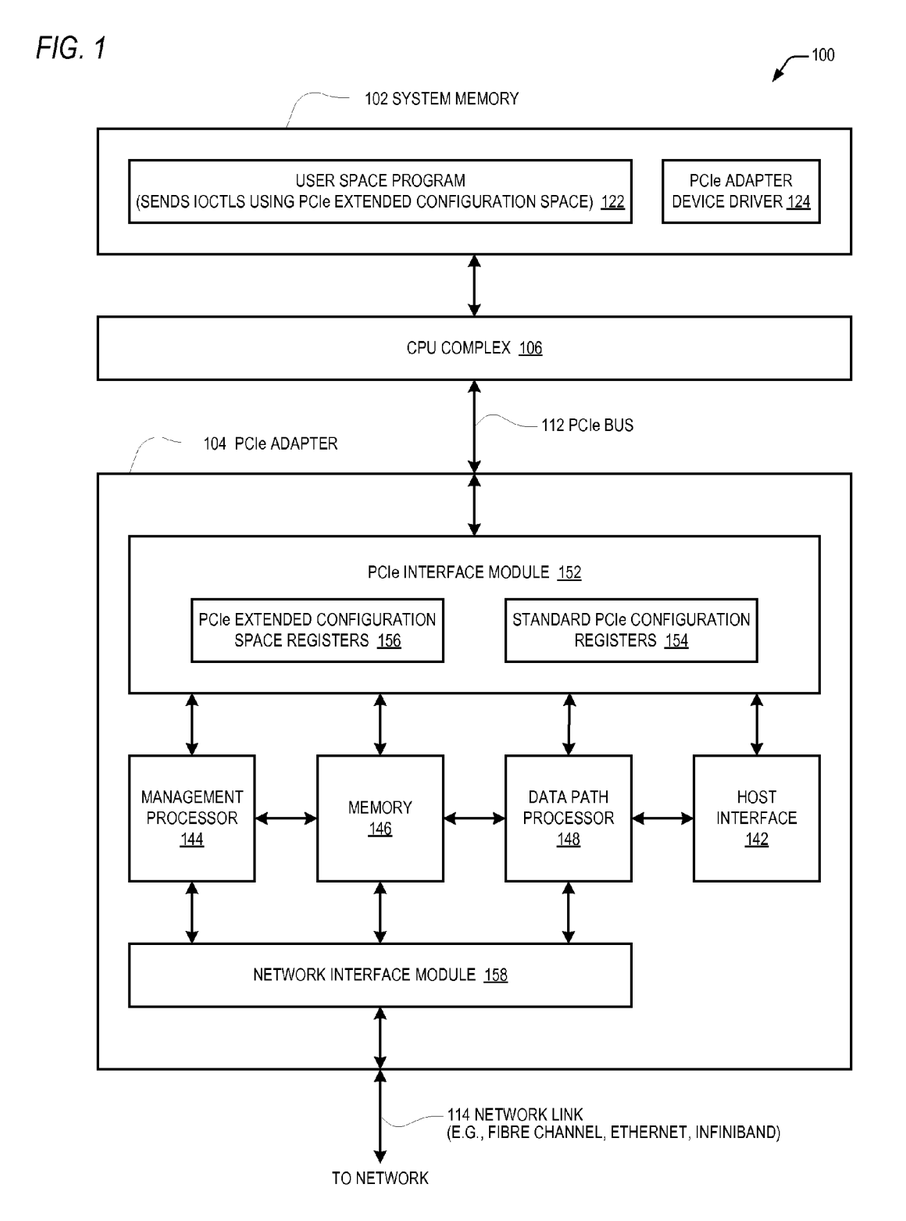
FIG. 1 is a block diagram illustrating a computer system.

Referring now to FIG. 1, a block diagram illustrating a computer system 100 is shown. The computer system 100 includes a CPU complex 106 coupled to a system memory 102 and a PCIe adapter 104. The PCIe adapter 104 is coupled to the CPU 106 via a PCIe bus 112. The PCIe bus 112 is a bi-directional serial link. The PCI Express® Base 3.0 specification, which is incorporated by reference herein in its entirety for all purposes, describes the PCIe bus, the PCIe protocol, and PCIe extended configuration space, which are well-known in the computer system arts. The system memory 102 stores a user space program 122 and a device driver 124 for the PCIe adapter 104 each of which the CPU 106 executes. Generally, programs access the PCIe adapter 104 through the device driver 124; however, advantageously, the user space program 122 may also access the PCIe adapter 104 directly—that is, without going through the device driver 124—by sending ioctls through PCIe extended configuration space registers 156 of the PCIe adapter 104, as described below in more detail. The user space program 122 and device driver 124 are preferably stored on the system 100 in non-volatile storage (not shown), such as a disk drive or solid state disk (SSD), and loaded into the system memory 102 to be executed by the CPU 106.

The PCIe adapter 104 is also coupled to a network link 114 by a port (not shown). The network link 114 connects the PCIe adapter 104 to a network. The network may include, but is not limited to, a network of Ethernet, Fibre Channel, Infiniband, Small Computer System Interface (SCSI), High Performance Parallel Interface (HIPPI), Token Ring, Arcnet, Fiber Distributed Data Interface (FDDI), LocalTalk, Enterprise Systems Connection (ESCON), Fibre Connection (FICON), Asynchronous Transfer Mode (ATM), Serial Attached SCSI (SAS), Advanced Technology Attachment (ATA), Serial ATA (SATA) or Universal Serial Bus (USB) nodes. Furthermore, various protocols may be employed on the network, including, but not limited to, the following: Internet Protocol version 4 (IPv4), Internet Protocol version 6 (IPv6), Fibre Channel over Ethernet (FCoE), FCoE Initialization Protocol (FIP), Internet Control Message Protocol (ICMP), Explicit Congestion Notification (ECN), Internet Group Management Protocol (IGMP), Internet Protocol Security (IPsec), Transmission Control Protocol (TCP), Dynamic Host Configuration Protocol (DHCP), File Transfer Protocol (FTP), Hypertext Transfer Protocol (HTTP), Internet Message Access Protocol (IMAP), Domain Name System (DNS) and Simple Mail Transfer Protocol (SMTP), User Datagram Protocol (UDP), AppleTalk Transaction Protocol (ATP), Reliable Datagram Protocol (RDP), Sequence Packet Exchange (SPX), NetBIOS Frames Protocol (NBX), Internet Small Computer System Interface (iSCSI), Network File System (NFS), Fibre Channel Protocol (FCP), RDMA over Converged Ethernet (RoCE), Internet Wide Area RDMA Protocol (iWARP), and raw IP.

The PCIe adapter 104 includes a PCIe interface module 152 coupled to the PCIe bus 112. The PCIe interface module 152 interfaces the PCIe adapter 104 with the PCIe bus 112 of the computer system 100 to facilitate transfers of data between the PCIe adapter and the system memory 102. The PCIe interface module 152 includes standard PCIe configuration registers 154 and the PCIe extended configuration space registers 156.

The PCIe adapter 104 also includes a network interface module 158 coupled to the network link 114. The network interface module 158 transceives frames on the link 114. Although the network interface module 158 is shown being coupled to a physical network link 114, in other embodiments the network interface module 158 wirelessly interfaces the PCIe adapter 104 to the network.

The PCIe adapter 104 also includes a management processor 144, a memory 146 (e.g., DDR memory) and a data path processor 148 each of which is coupled to the network interface module 158 and to the PCIe interface module 152. The PCIe adapter 104 also includes a host interface 142 coupled to the PCIe interface module 152. The management processor 144 and data path processor 148 are coupled to the memory 146, and the host interface 142 is coupled to the data path processor 148.

In one embodiment, the PCIe adapter 104 is a single chip, or device, and may even be a single integrated circuit. In other embodiments, the PCIe adapter 104 may include multiple chips, or devices, that are integrated on a circuit board, such as a motherboard of the system 100 or on an external adapter that plugs in to a PCIe slot of the system 100.

Figure 2:
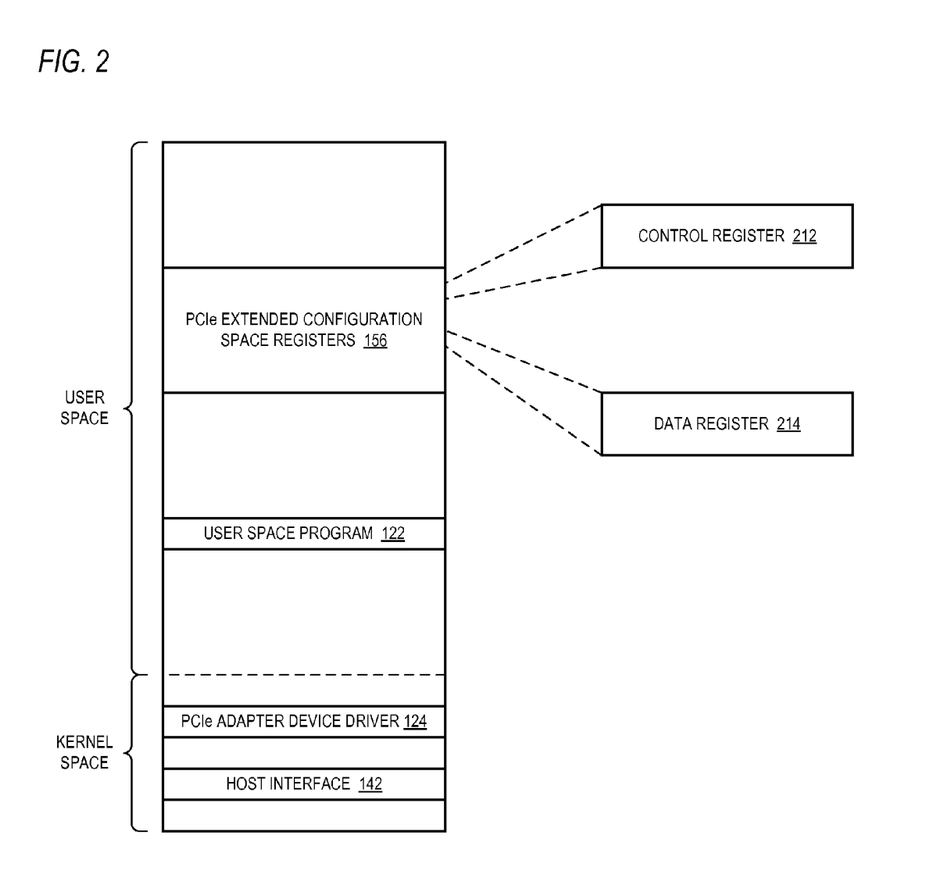
FIG. 2 is a block diagram illustrating the memory space of the system of FIG. 1.

PCIe specifies 256 bytes of standard PCI configuration space that the operating system or other system software (e.g., BIOS) may use to configure PCIe devices, such as the PCIe adapter 104. The standard PCIe configuration registers 154 are included in the standard PCI configuration space and are used by the system software (e.g., BIOS and/or operating system) to configure the host interface 142, that is, to map the host interface 142 into the system address space, as shown in FIG. 2. The device driver 124 sends commands to the PCIe adapter 104 through the host interface 142. PCIe also specifies an additional 3840 bytes of extended configuration space, which is referred to herein as the PCIe extended configuration space. The system software maps the PCIe extended configuration space registers 156 into the system address space, as shown in FIG. 2. The user space program 122 sends ioctls to the PCIe adapter 104 through the PCIe extended configuration space registers 156.

Preferably, the management processor 144 processes the ioctls sent by the user space program 122 via the PCIe extended configuration space registers 156. Thus, the management processor 144 and its associated firmware is the ioctl processing module. Preferably, the data path processor 148 processes the commands sent by the device driver 124 via the host interface 142, which includes controlling the network interface module 158 to cause it to transceive frames on the network. However, other embodiments are contemplated in which the data path processor 148 processes the ioctls sent by the user space program 122 via the PCIe extended configuration space registers 156. Additionally, embodiments are contemplated in which the PCIe adapter 104 includes a single processor rather than multiple processors, and the single processor processes both ioctls and device driver commands. Finally, embodiments are contemplated in which the ioctl processing module is a hardware state machine. In one embodiment, the management processor 144 is an Advanced RISC Machines (ARM) processor that executes firmware stored in the memory 146 or another memory (not shown) dedicated to and/or embedded in the management processor 144, although embodiments with other processors are contemplated.

Referring now to FIG. 2, a block diagram illustrating the memory space of the system 100 of FIG. 1 is shown. Preferably, the operating system manages the system address space as a separate user space and kernel space. Preferably, the host interface 142 of FIG. 1 is mapped into the kernel space, and the PCIe extended configuration space registers 156 of FIG. 1 are mapped into the user space so that the operating system allows the user space program 122 to access them. Preferably, the operating system, including the device driver 124, runs in the kernel space, whereas the user space program 122 runs in the user space.

Figure 5A:
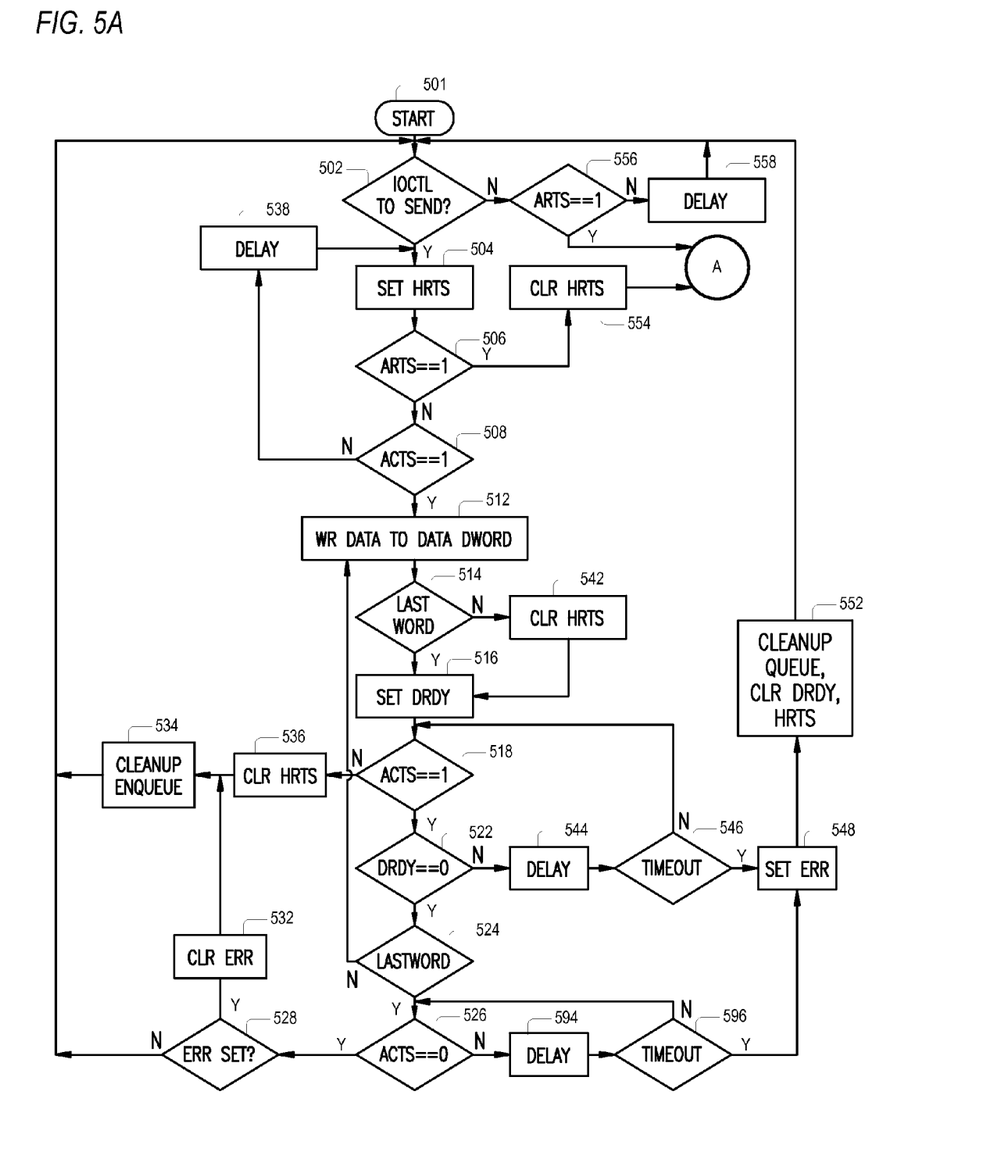
FIG. 5A is a flowchart illustrating one embodiment of a method for the user space program of FIG. 1 to send an ioctl to the PCIe adapter of FIG. 1 to receive the results of the ioctl.
Figure 5B:
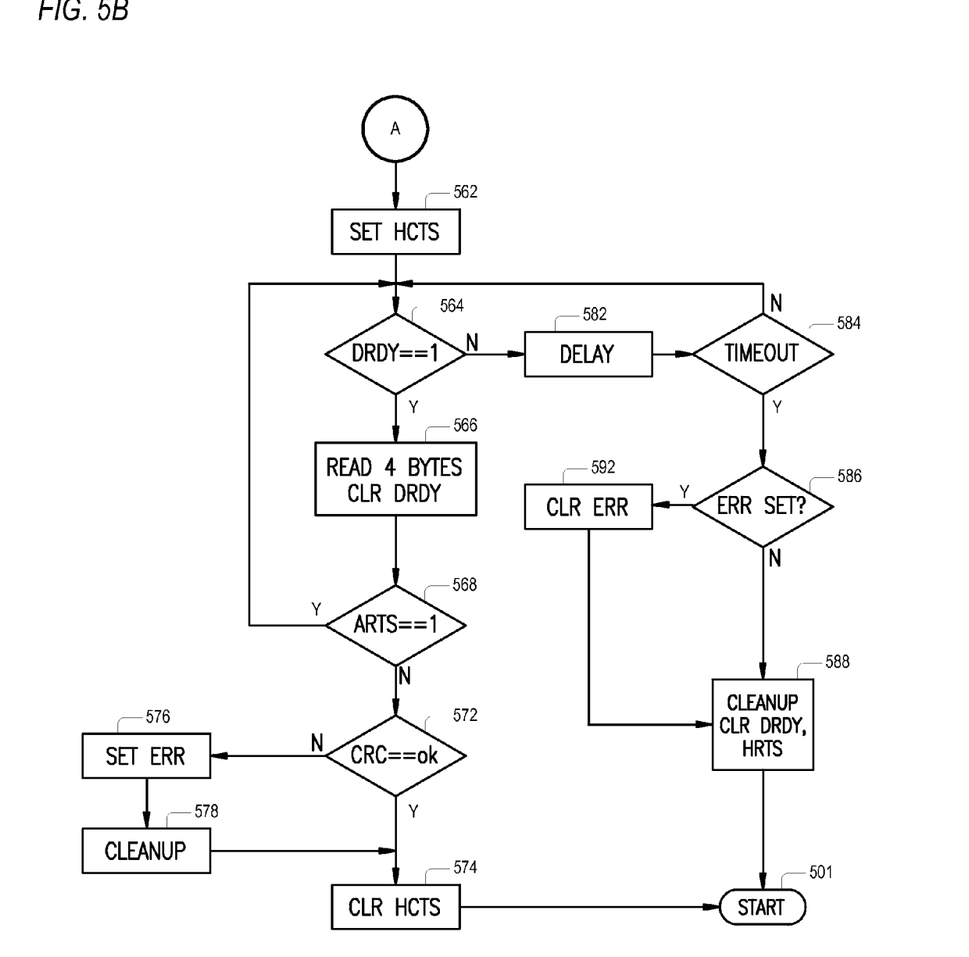
FIG. 5B is a continuation of the flowchart of FIG. 5A illustrating one embodiment of a method for the user space program of FIG. 1 to receive the results of the ioctl from the PCIe adapter of FIG. 1. The two portions of the flowchart are connected at the circle symbol marked with the letter "A.

According to one embodiment, the PCIe extended configuration space registers 156 include a control register 212 and a data register 214, as shown, that the user space program 122 and PCIe adapter 104 use to communicate in a manner described with respect to FIGS. 5A and 5B in order to send ioctls and receive their results. In one embodiment, the control register 212 resides at offset 0x1F0 and the data register 214 resides at offset 0x1F4 of the PCIe extended configuration space. However, other embodiments are contemplated in which the PCIe extended configuration space registers 156 comprise other registers that the user space program 122 and PCIe adapter 104 use to communicate in a different manner, some of which are described in more detail below. However, it should be understood that the present invention is not limited to the embodiments described herein in which the user space program 122 and PCIe adapter 104 use the PCIe extended configuration space registers 156 to communicate in order to send ioctls and receive their results, but rather is intended to encompass other embodiments in which a user space program 122 sends ioctls to a PCIe adapter 104 via PCIe extended configuration space.

Figure 3:
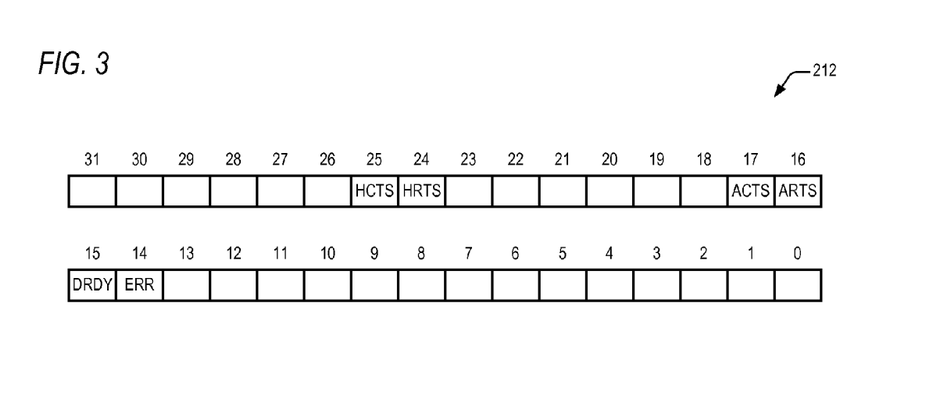
FIG. 3 is a block diagram illustrating the control register of FIG. 2.

Referring now to FIG. 3, a block diagram illustrating the control register 212 of FIG. 2 is shown. Preferably, the control register 212 is a 32-bit register, as is the data register 214 of FIG. 2, although other register widths are contemplated. The control register 212 includes a host clear to send (HCTS) bit, a host request to send (HRTS) bit, an adapter clear to send (ACTS) bit, an adapter request to send (ARTS) bit, a data ready (DRDY) bit, and an error (ERR) bit. These bits are used by the user space program 122 and PCIe adapter 104 to send ioctls and receive results thereof via the PCIe extended configuration space registers 156, such as described in more detail below with respect to an embodiment of FIGS. 5A and 5B.

Figure 4:
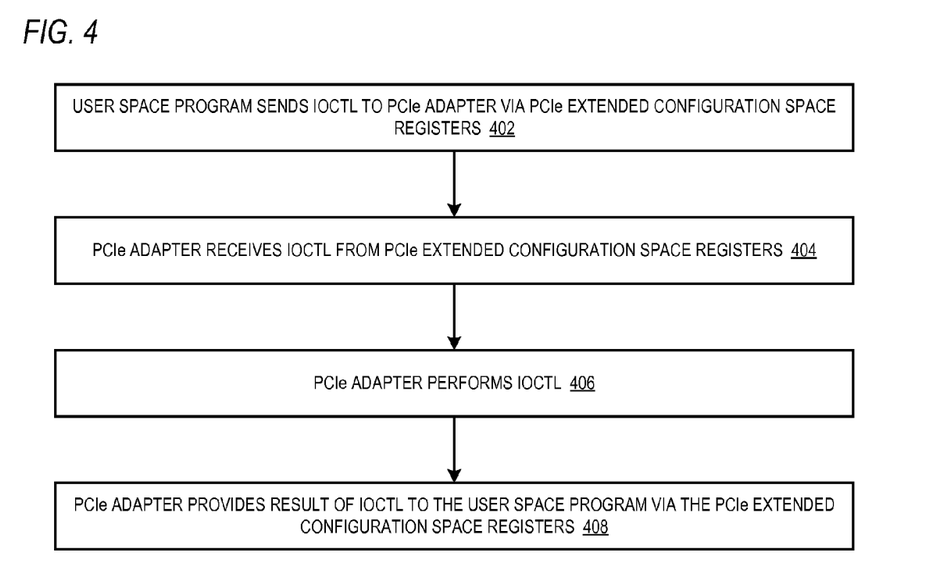
FIG. 4 is a flowchart illustrating operation of the system of FIG. 1.

Referring now to FIG. 4, a flowchart illustrating operation of the system 100 of FIG. 1 is shown. Flow begins at block 402.

At block 402, the user space program 122 sends an ioctl to the PCIe adapter 104 via the PCIe extended configuration space registers 156. That is the user space program 122 writes to the PCIe extended configuration space of the PCIe adapter 104 (and reads from the PCIe extended configuration space of the PCIe adapter 104, if necessary) to inform the PCIe adapter 104 of the presence of an ioctl that it wishes the PCIe adapter 104 to perform. One embodiment of the manner in which the user space program 122 sends the ioctl to the PCIe adapter 104 is described with respect to FIG. 5A and other embodiments are described below. Flow proceeds to block 404.

At block 404, the PCIe adapter 104 (e.g., the management processor 144) becomes aware of the ioctl and receives the ioctl from the PCIe extended configuration space registers 156. Flow proceeds to block 406.

At block 406, the PCIe adapter 104 (e.g., the management processor 144) performs the operation specified by the ioctl received at block 404. An example list of ioctls is provided below for illustration purposes. Flow proceeds to block 408.

At block 408, the PCIe adapter 104 (e.g., the management processor 144) provides the result of the ioctl to the user space program 122 via the PCIe extended configuration space registers 156. That is, the PCIe adapter 104 writes the PCIe extended configuration space registers 156 (and reads from the PCIe extended configuration space registers 156, if necessary) to inform the user space program 122 of the presence of the results of the ioctl that the PCIe adapter 104 performed. One embodiment of the manner in which the PCIe adapter 104 provides the result of the ioctl to the user space program 122 is described with respect to FIG. 5B and other embodiments are described below. Flow ends at block 408.

The ioctls may include, but are not limited to, any of the following.

IOCTL_ISCSI_INI_SESSION_GET_ALL_SESSIONS: This ioctl is used to retrieve information on all sessions in a domain. The session_flags field can be used to filter the returned data.

IOCTL_ISCSI_INI_SESSION_GET_CONFIGURATION: This ioctl is used to get non iSCSI-related parameters for a particular session. An OS-specific driver layer may use this call to retrieve the Bus-Target mapping used for a persistent session, before exposing the same to the OS. It may also be used to determine the error recovery behavior set for a target.

IOCTL_ISCSI_INI_SESSION_LOGIN_TARGET: This ioctl is used by management layers to login to a target and make a new session. If the login is successful, a session_handle is returned. This handle should be used for all session management functions. The adapter firmware also returns a target_id field. This is a reference to the adapter firmware's internal data structures for a target and should be used as an identifier in all Persistent-Target ioctls. This ioctl will result in an asynchronous message ASYNC_EVENT_NEW_ISCSI_CONNECTION_ESTABLISHED. This asynchronous message is sent on a successful login, to the intended domain when a [b]data[/b] session is established.

IOCTL_ISCSI_INI_SESSION_DELETE_PERSISTENT_LOGIN: This ioctl is used by management layers to delete a persistent target. The adapter firmware removes the target from Flash.

IOCTL_ISCSI_INI_DRIVER_REOPEN_ALL_SESSIONS: This ioctl should be issued during a session recovery, to re-open all previously existing sessions.

IOCTL_ISCSI_INI_DRIVER_INVALIDATE_CONNECTION: This ioctl should be used to invalidate a connection and optionally send a TCP reset before terminating the connection and releasing all I/O requests and other resources. The management processor firmware forwards this request to the data path processor firmware. The data path processor firmware will clean up its internal data structures and issue a TCP reset if IOCTL_ISCSI_CONNECTION_ISSUE_TCP_RST is set.

IOCTL_ISCSI_INI_DRIVER_REOPEN_A_CONN: This ioctl can be used in response to an async message ASYNC_EVENT_NEW_TCP_CONNECTION_ESTABLISHED to issue an iSCSI login to add a connection to an existing session. The adapter firmware will return the MCC Command WRB immediately, without waiting for the actual login to complete. When login completes, the adapter firmware will provide Asynchronous notification ASYNC_EVENT_NEW_ISCSI_CONNECTION_ESTABLISHED that a new iSCSI connection has been established.

IOCTL_ISCSI_TGT_CONNECTION_REJECT: Target host drivers use this ioctl to inform the management processor firmware to close and free the connection handle associated with this TCP connection. The host is unable to accept a connection (possibly because there are too many iSCSI connections). A TCP reset was received on a connection before the host could accept/offload the connection. In general, once a connection_handle is notified to host, the management processor firmware will not free connection_handle (even after receiving a TCP reset) until this ioctl or IOCTL_ISCSI_TGT_OFFLOAD_CONNECTION is received. This ioctl may return one of the following status values in the response: MGMT_STATUS_SUCCESS to indicate success, MGMT_STATUS_FAILED to indicate failure with additional status, or MGMT_ADDL_STATUS_TGT_INVALID_CONN_HANDLE to indicate an invalid connection handle.

IOCTL_RDMA_ALLOC_MW: This ioctl is used for allocating a protection domain.

IOCTL_RDMA_QUERY_MW: This ioctl is used for querying a protection domain.

IOCTL_COMMON_FCOE_WRBQ_CREATE: This ioctl is used for making FCoE WRB ring. The management processor will update the XRI_start, XRI_end in the FC WRB context memory when this ioctl is received.

IOCTL_COMMON_FCOE_DEFQ_CREATE: This ioctl is for making FCoE default PDU ring. Use opcode OPCODE_COMMON_FCOE_DEFQ_CREATE.

IOCTL_COMMON_FCOE_REMOVE_HDR_TEMPLATES: This ioctl is for removing posted template header pages. All template header pages posted by the caller via IOCTL_COMMON_FCOE_POST_HDR_TEMPLATES are removed from the adapter.

IOCTL_COMMON_FCOE_READ_FCF_TABLE: The management processor firmware builds a database of Fibre Channel Forwarders (FCFs) based on FIP discovery. This ioctl allows management software to retrieve each valid entry from that table. To fetch all the entries in the table: (1) Set fcf_index=−1 in the request and call this ioctl and (2) Check the ioctl status in the response. If the status is MGMT_STATUS_SUCCESS: (a) The ioctl returned an FCF Record. (b) Check the next_valid_fcf_index field in the response. (c) If this field is set to −1, no more valid FCFs exist. (d) If next_valid_fcf_index is not −1 issue the next call to this ioctl by setting fcf_index=next_valid_fcf_index. If the ioctl status response is MGMT_STATUS_NO_FCF_RECORDS no FCF record is returned. If this happens on the very first call with fcf_index=−1, no FCF records are present in the table. The call returns MGMT_STATUS_SUCCESS if an FCF_RECORD could be returned else MGMT_STATUS_NO_FCF_RECORDS is returned.

IOCTL_PXE_UNDI_TRANSMIT: This ioctl will send a Network Interface Controller (NIC) packet to a specified port. The transmit buffer should include MAC headers.

IOCTL_PXE_UNDI_SET_VLAN: This ioctl is used to set the VLAN Status, VLAN Tag and Priority for the Universal Network Device Interface (UNDI) NIC Function.

IOCTL_ETH_NETWORK_STATS: This ioctl is for querying NIC/TOE statistics for a given network function.

IOCTL_ETH_PG_FEATURE_QUERY_REQUEST: This ioctl is for querying Priority Group (PG) capabilities required to configure the Ethernet stack for supporting Priority-Based Flow Control (PFC)/PG. Return codes. If the query bit was set and none of the feature bits were set, adapter firmware will return MGMT_STATUS_ILLEGAL_REQUEST. If query bit was not set and none of the feature bits were set, adapter firmware will return MGMT_STATUS_ILLEGAL_REQUEST. Adapter firmware will return MGMT_STATUS_FAILED for all other errors.

IOCTL_LLDP_GET_LLDP_CFG: This ioctl should be issued by management software to get the current Link Layer Discovery Protocol (LLDP) settings from the management processor firmware. Two types of parameters can retrieved: Default parameters and Parameter set by the administrator of this node using the IOCTL_LLDP_SET_LLDP_CFG.

IOCTL_LLDP_SET_LLDP_CFG: This ioctl should be issued by management software to set the current LLDP settings to the management processor firmware. The ioctl STATUS returned is MGMT_STATUS_SUCCESS.

It should be understood that these ioctls, which primarily relate to Ethernet and Fibre Channel adapters, are provided for illustration, and the ioctls the user space program 122 may send to the PCIe adapter 104 via the PCIe extended configuration space registers 156 are not limited to those listed here. Other ioctls may perform the following functions: splitting the bandwidth of the link into multiple streams and specifying the quality of service of each stream, similar to the manner used by VLAN tags and VLAN priorities in Ethernet; enabling/disabling DHCP; initiating/closing an Ethernet connection; reading various statistics (e.g., packets dropped, error conditions); enabling/disabling a digest (otherwise known as the hash, or cyclic redundancy check (CRC), of a frame); enabling/disabling boot mode access; setting/deleting the initiator IP address; setting the target IP address (for logging in to the target); collecting operation or error statistics for a higher level protocol, which may be on a specified port of the adapter. As mentioned above, each type of PCIe adapter has its own specific set of ioctls that it supports.

Referring now to FIGS. 5A and 5B, which are referred to collectively as FIG. 5, a flowchart illustrating one embodiment of a method for the user space program 122 of FIG. 1 to send an ioctl (FIG. 5A) to the PCIe adapter 104 of FIG. 1 and to receive the results of the ioctl (FIG. 5B) is shown. Throughout the description of FIGS. 5A and 5B, reference is made to the bits of the control register 212 described with respect to FIG. 3 of the PCIe extended configuration space registers 156.

At the start of FIG. 5A illustrated by block (501), the user space program 122 determines whether it has an ioctl to send to the PCIe adapter 104 as shown at block (502). If so, the user space program 122 sets HRTS at block (504); otherwise it determines whether ARTS is set at block (506) to determine whether the PCIe adapter 104 is ready to provide its results of an ioctl. If so, the user space program 122 clears HRTS at block (554) and proceeds to block (562) to receive the result of an ioctl from the PCIe adapter 104. After setting HRTS at block (504), the user space program 122 determines whether ACTS is set at block (508). If not, the user space program 122 delays at block (538) and then sets HRTS again at block (504). If ACTS is set, the user space program 122 writes the next word (which may be the first word) of the ioctl to the data register 214 at block (512). In one embodiment, the word size is 32 bits. The user space program 122 then determines whether this is the last word of the ioctl to send at block (514). If not, the user space program 122 clears HRTS at block (542) prior to setting DRDY at block (516). The user space program 122 then determines whether ACTS is set at block (518). If so, the user space program 122 determines whether DRDY is clear at block (522) and if so the user space program 122 determines whether this is the last word of the ioctl to send at block (524). If not, the user space program 122 writes the next word (which may be the first word) of the ioctl to the data register 214 at block (512).

If at block (518) ACTS is clear, the user space program 122 clears HRTS at block (536), cleans up from an error condition at block (534) and returns to make the decision at block (502).

If at block (522) the user space program 122 determines that DRDY is set, the user space program 122 delays at block (544) and if a timeout occurred at block (546), sets the ERR bit at block (548), cleans up from the error condition and clears DRDY and HRTS at block (552) and returns to make the decision at block (502). If a timeout did not occur at block (546), the user space program 122 determines whether ACTS is set at block (518).

If at block (524) this was the last word of the ioctl, the user space program 122 determines whether ACTS is clear at block (526) and if so, determines whether ERR is set at block (528). If so, the user space program 122 clears ERR at block (532), cleans up from an error condition at block (534) and returns to make the decision at block (502); otherwise, the user space program 122 simply returns to make the decision at block (502) since it has successfully sent the ioctl to the PCIe adapter 104.

If at block (526) ACTS is set, the user space program 122 delays at block (594) and if a timeout occurred at block (596), sets the ERR bit at block (548), cleans up from the error condition and clears DRDY and HRTS at block (552) and returns to make the decision at block (502). If a timeout did not occur at block (596), the user space program 122 makes the decision at block (526).

If at block (502) the user space program 122 does not have an ioctl to send, the user space program 122 determines whether ARTS is set. If so, it delays at block (558) and returns to make the decision at block (502); otherwise, it proceeds to block (562) to receive the result of an ioctl from the PCIe adapter 104.

At block (562) the user space program 122 sets HCTS and then determines whether DRDY is set at block (564). If so, the user space program 122 reads a word of the result of the ioctl from the data register 214 at block (566) and determines whether ARTS is set at block (568). If so, the user space program 122 returns to make the decision at block (564); otherwise, the user space program 122 determines whether the CRC generated by the PCIe adapter 104 is correct at block (572). If the CRC is correct at block (572), the user space program 122 clears HCTS at block (574) and returns to make the decision at block (502); otherwise, the user space program 122 sets the ERR bit at block (576), cleans up the error condition at block (578), clears HCTS at block (574) and returns to make the decision at block (502).

If at block (564) DRDY is clear, the user space program 122 delays at block (582) and then determines whether a timeout has occurred at block (584). If not, the user space program 122 returns to make the decision at block (564). If a timeout did occur at block (584), the user space program 122 determines whether the ERR bit is set at block (586). If so, the user space program 122 clears the ERR bit at block (592) before cleaning up the error condition, clearing DRDY and HRTS at block (588) and returning to make the decision at block (502).

Although FIGS. 5A and 5B describe the flow of the user space program 122 to send an ioctl to the PCIe adapter 104 and to receive the result of an ioctl from the PCIe adapter 104, the setting and clearing of the various bits of the control register 212 by the PCIe adapter 104 to receive the ioctl from the user space program 122 and to provide the result of the ioctl to the user space program 122 is similar and in many ways a mirror image and may readily be understood from the description of FIGS. 5A and 5B. In one embodiment, when the user space program 122 is sending an ioctl to the PCIe adapter 104, if the management processor 144 detects a timeout then the management processor 144 clears ACTS, and if the user space program 122 detects a timeout then the user space program 122 sets the ERR bit. Conversely, when the PCIe adapter 104 is sending an ioctl result to the user space program 122, if the management processor 144 detects a timeout then the management processor 144 sets the ERR bit, and if the user space program 122 detects a timeout then the user space program 122 clears HCTS.

Alternate embodiments for receiving ioctls and providing results thereof via the PCIe extended configuration space registers 156 will now be described. In one embodiment, the ioctl processing module (e.g., the management processor 144) polls the bits of the control register 212 (e.g., HRTS, HCTS, DRDY) to perform the actions on the PCIe adapter 104 that coordinate with the user space program 122 actions described in FIGS. 5A and 5B in order to receive the ioctl and provide its result. In an alternate embodiment, the ioctl processing module receives an interrupt from the PCIe interface module 152 each time the user space program 122 writes a word of the ioctl to the data register 214 (e.g., at block (512) of FIG. 5A), which reduces the burden on the management processor 144 of polling the control register 212. In another alternate embodiment, the PCIe interface module 152 includes a buffer that receives the entire ioctl and then interrupts the ioctl processing module. In this embodiment, the PCIe interface module 152 knows the length of the ioctl by examining the ioctl length field in the ioctl. In one embodiment in which the buffer size (e.g., 256 bytes) is less than the maximum permissible size of an ioctl (e.g., 64 Kbytes), the ioctl processing module receives an interrupt each time the buffer becomes full with a chunk of the ioctl. In one embodiment, the ioctl processing module allocates space in the memory 146 to receive ioctls, and registers chunks of the allocated memory space with the PCIe interface module 152. The PCIe interface module 152 uses the memory chunks to collect the entire ioctl before interrupting the ioctl processing module. If the PCIe interface module 152 determines from the length field in the ioctl that it does not have enough registered memory chunks to receive the entire ioctl, it can interrupt the ioctl processing module which may register more chunks or may process some of the ioctl and re-register the processed chunks with the PCIe interface module 152. Conversely, to provide the result of the ioctl to the user space program 122, the ioctl processing module may pass the address of the result in the memory 146 and its length to the PCIe interface module 152, which independently provides the result to the user space program 122 via the PCIe extended configuration space registers 156.

In one embodiment, the lower 17 bits of the first 32-bit word of the ioctl specifies the length of the ioctl and the upper 15 bit are reserved; the lower 16 bits of the second 32-bit word of the ioctl specifies a PCI function number (e.g., that identifies a port of the network interface module 158); the upper 16 bits of the second 32-bit word of the ioctl specifies a sequence number (to facilitate out-of-order completion of ioctls); and the last 32-bit word is a CRC of the ioctl, which the ioctl processing module checks. In one embodiment, the first 32-bit word that includes the length is excluded from the CRC calculation. Preferably, the result of the ioctl also includes a length, PCI function number, sequence number and CRC word. Furthermore, preferably the PCIe adapter 104 is configured to send asynchronous messages to the user space program 122, e.g., link up/link down messages, via the PCIe extended configuration space registers 156. Finally, in one embodiment, the PCIe extended configuration space registers 156 include two data registers (similar to data register 214) to facilitate full duplex communication between the user space program 122 and the PCIe adapter 104.

Although embodiments are described in which the user space program sends ioctls to a PCIe adapter that is a network adapter, other embodiments are contemplated in which the PCIe adapter adapts other functions to the computer system PCIe bus and in which a user space program sends ioctls to the PCIe adapter via the PCIe extended configuration space registers 156. That is, the sending of ioctls to a PCIe adapter via PCIe extended configuration space rather than through a device driver may be advantageous for ameliorating the issues posed by open source operating system development processes not only for network interface PCIe adapters (which as defined above includes storage interface PCIe adapters), but also PCIe adapters of other types which need to receive commands that are typically sent to an adapter through a device driver via a system call, such as the ioctl or DeviceIoControl system calls. Examples of other types of PCIe adapters may include, but are not limited to, PCIe video adapters, sound adapters, USB devices, Bluetooth® devices, FireWire devices and optical devices such as CD-ROM and DVD devices. In these embodiments, the ioctls are related to the other functions the PCIe adapter adapts to the host computer system and that are not related to the PCIe fabric by which the PCIe adapter interconnects to the computer system, and therefore the ioctls do not relate to the transceiving of frames by the adapter on the PCIe fabric 112.

Furthermore, although advantages of the embodiments have been described with respect to use on a system that runs an open source operating system, it should be understood that sending ioctls to a PCIe adapter via PCIe extended configuration space might provide advantages in a system that runs a non-open source operating system. For example, not sending ioctls through the device driver allows the testing effort to be segregated to the user space program and away from the device driver. This may be beneficial since the device driver is part of the operating system and therefore the device driver may require more rigorous or cumbersome testing than a user program before being released. Secondly, the adapter manufacturer or a third party developer may develop the user space program without involvement by the device driver/operating system developer.

Finally, although embodiments are described in which the local bus interface is PCIe, other embodiments are contemplated in which the adapter adapts the network or other function to the host computer system via a different host bus than PCIe and which includes an alternate programming space that the operating system allows user programs to access which would not conflict with the adapter device driver access of the host interface.

While various embodiments of the present invention have been described herein, it should be understood that they have been presented by way of example, and not limitation. It will be apparent to persons skilled in the relevant computing arts that various changes in form and detail can be made therein without departing from the scope of the invention. For example, software can enable the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known non-transitory computer usable medium such as magnetic tape, semiconductor, magnetic disk, or optical disc (e.g., CD-ROM, DVD-ROM, etc.), a network, or wire line, or other communications medium. Embodiments of the apparatus and method described herein may be included in an integrated circuit. Additionally, the apparatus and methods described herein may be embodied as a combination of hardware and software. Thus, the present invention should not be limited by any of the exemplary embodiments described herein, but should be defined only in accordance with the following claims and their equivalents. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed:

1. An adapter, comprising:
   a hardware-based network interface module, configured to interface the adapter to a network;
   a hardware-based Peripheral Component Interconnect Express (PCIe) interface module, configured to interface the adapter to a PCIe bus, wherein the PCIe interface module comprises registers in PCIe extended configuration space, wherein the registers are configured to receive ioctls from the PCIe bus; and
   a hardware-based ioctl processing module, configured to receive the ioctls from the registers, to perform the ioctls, and to provide results of the ioctls to the registers for provision by the registers to the PCIe bus;
   wherein:
      the ioctls comprise commands that relate to transceiving of frames by the adapter on the network; and
      the ioctls are sent directly from a program of a user space in a system comprising the adapter, bypassing a device driver that drives the adapter, where an operating system running on the system comprises the device driver.

2. The adapter of claim 1, wherein at least one of the ioctls requests the adapter to provide statistics about the frames transceived by the adapter on the network.

3. The adapter of claim 1, wherein the ioctl requests the adapter to set a virtual network tag and priority of the frames transceived by the adapter on the network.

4. The adapter of claim 1, wherein the ioctl requests the adapter to set a protocol address associated with a port of the adapter configured to couple to the network.

5. The adapter of claim 1, wherein the network comprises an Ethernet network.

6. The adapter of claim 1, wherein the network comprises a Fibre Channel fabric.

7. The adapter of claim 1, wherein the network comprises an Infiniband fabric.

8. A hardware-based module of an adapter, the module comprising:
   a first portion of the module, configured to receive ioctls via Peripheral Component Interconnect Express (PCIe) extended configuration space; and
   a second portion of the module, configured to provide results of the ioctls via the PCIe extended configuration space;
   wherein:
      the ioctls comprise commands that relate to transceiving of frames by the adapter on a network to which the adapter is coupled; and
      the ioctls are sent directly from a program of a user space in a system comprising the adapter, bypassing a device driver that drives the adapter, where an operating system running on the system comprises the device driver.

9. The module of claim 8, wherein at least one of the ioctls requests the adapter to provide statistics about the frames transceived by the adapter on the network.

10. The module of claim 8, wherein the ioctl requests the adapter to set a virtual network tag and priority of the frames transceived by the adapter on the network.

11. The module of claim 8, wherein the ioctl requests the adapter to set a protocol address associated with a port of the adapter configured to couple to the network.

12. The module of claim 8, wherein the network comprises an Ethernet network.

13. The module of claim 8, wherein the network comprises a Fibre Channel fabric.

14. The module of claim 8, wherein the network comprises an Infiniband fabric.

15. A method, comprising:
   sending, by a program of a user space in a system comprising a Peripheral Component Interconnect Express (PCIe) adapter, an ioctl;
   receiving, by the PCIe adapter, the ioctl via PCIe extended configuration space; and
   providing, by the PCIe adapter, a result of the ioctl via the PCIe extended configuration space;
   wherein:
      the ioctl comprises a command that relates to transceiving of frames by the adapter on a network to which the adapter is coupled; and
      the ioctl is sent directly from the program of the user space, bypassing a device driver that drives the adapter, where an operating system running on the system comprises the device driver.

16. The method of claim 15, further comprising:
   writing, by a program, the ioctl to registers of the PCIe extended configuration space, prior to said receiving;
   wherein the program executes in user space, rather than kernel space, of a computer system that includes the PCIe adapter.

17. The method of claim 16, wherein said writing the ioctl to registers of the PCIe extended configuration space is performed without invoking a device driver of an operating system running on the computer system.

18. The method of claim 15, wherein at least one of the ioctls requests the adapter to provide statistics about the frames transceived by the adapter on the network.

19. The method of claim 15, wherein the ioctl requests the adapter to set a virtual network tag and priority of the frames transceived by the adapter on the network.

20. The method of claim 15, wherein the ioctl requests the adapter to set a protocol address associated with a port of the adapter configured to couple to the network.

* * * * *